E. B. MÉRIGOUX.
RESILIENT TIRE.
APPLICATION FILED APR. 15, 1908.

965,922.

Patented Aug. 2, 1910.

UNITED STATES PATENT OFFICE.

EMILE BAPTISTE MÉRIGOUX, OF PARIS, FRANCE.

RESILIENT TIRE.

965,922.

Specification of Letters Patent.  Patented Aug. 2, 1910.

Application filed April 15, 1908. Serial No. 427,133.

*To all whom it may concern:*

Be it known that I, EMILE BAPTISTE MÉRIGOUX, a citizen of the Republic of France, residing at Paris, in France, have invented new and useful Improvements in Resilient Tires, of which the following is a specification.

This invention relates to improvements in resilient tires said improvements being for the purpose of securing a better connection between the elements of the tire, to render them nonskidding and to fix the resilient elements more intimately to the metallic elements serving to support and connect them to the rim of the wheel.

The annexed drawing illustrate examples of construction of the improvements in which—

Figure 1:
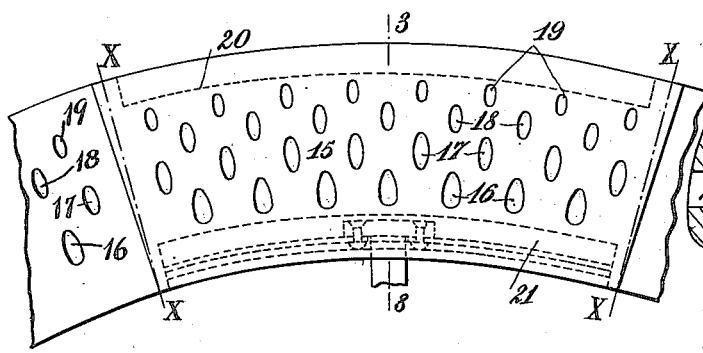
Figure 3:
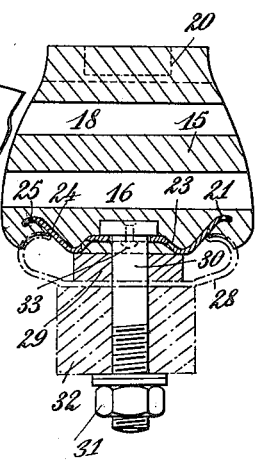
Figure 2:
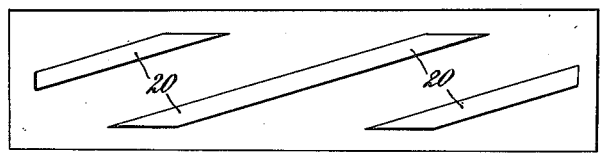

Figure 1 is a side elevation of one complete segment showing adjacent ends of two abutting segments. Figs. 2 and 3 are respectively a plan view, and a vertical section on the line 3—3 of Fig. 1.

The resilient element of rubber shown in Figs. 1, 2 and 3 consists of a segment 15 embracing a determined part of the circumference of the wheel and pierced transversely with several rows of holes 16, 17, 18, 19 arranged as is shown in Fig. 1, the said holes being elongated in the radial direction and having an elliptical or oval shape to give greater elasticity to the element 15. The section of this element is rectilinear on its periphery which constitutes the rolling surface and this flat surface is provided with oblique grooves 20, said grooves extending to within a certain distance from the edges of the element (Fig. 2). These grooves 20 prevent skidding as they become filled with matter which accumulates during the journey such as mud, gravel, fine pebbles and the like which become agglomerated and render the surface of the element sufficiently rough to prevent it slipping both in the tangential and in the transverse direction.

As shown in Fig. 1, the outer faces of the element 15 are not cut according to the diametrical lines X X but obliquely to the same. The ends of two consecutive elements thus cut are joined by means of rubber solution and tend constantly to adhere together in spite of the tangential strains tending to separate them, by reason of the friction which they exercise one on the other on the line of connection. Each elastic element 15 is fixed on a metallic element 21 consisting also of a segment of a circle; the transverse section of this element 21 is undulated to give greater resistance and also to embed it more easily either totally or partly in the elastic element. For this purpose it is pierced in the direction of its longitudinal axis and on each side of the same with several rows of holes 23, 24, 25 certain of the holes 24 being made so that their largest opening is toward the center of the curve of the element. The elastic element 15 is larger than the metallic element 21 (Fig. 3) and is so arranged that it completely covers the edges of the latter which is thus embedded in the rubber which penetrates the holes 22 and 23 on each side of the center of the metallic element 21 and completely fills the interior circular channel formed by the latter. The rubber also penetrates through the holes 25 in such a way as to connect the parts of the elastic element which surround the edges of the metallic element 21. The rubber fills also the holes 24 and forms a series of connections which resist the separation of the two elements.

It can be understood that portions of the elastic element 15 which are, respectively, radially outside of and radially inside of the metallic element 21 are connected by the material which extends through the holes 23 and 25 and that the two elements, elastic and metallic, are thus absolutely united and connected rigidly; the part of the elastic element which adjoins the metallic element is of hard rubber while the rest of this element is of soft rubber.

The metallic elements constructed as hereinbefore described are fixed on a metallic rim 28 (Fig. 3) preferably of the ordinary form suitable for pneumatic tires which allows the replacement of the latter by tires of my improved kind. The inner edges of the elastic element 15 are applied on the outer edges of the rim 28 as represented in the drawing and between the rim 28 and the metallic and elastic elements is arranged a strip 29 of leather, fabric, or rubber, of sufficient thickness to fill the space between the rim and the elements. Each of the strips is fixed on the rim 28 by a bolt 30 arranged at its center and provided with a nut 31, the bolt is carried by the ordinary interior wooden felly 32 carrying the rim 28.

The head of the bolt which is carried by the metallic element 21 is embedded in the rubber of element 15 and is fixed on the said element 21 by means of rivets 33, in such a way that on screwing up the nut 31 the rubber does not have to resist any torsional strain of the bolt 30.

Having now particularly described and ascertained the nature of my said invention and in what manner the same is to be performed, I declare that what I claim is:—

A tire composed of sections of yielding material provided with a tread and having a plurality of elongated cavities in the tread obliquely disposed therein and lying wholly within the lateral margins of the tread, said cavities being spaced apart from each other and arranged in staggered relation with the end of one cavity extending beyond the end of the next adjacent cavity.

In testimony whereof I affix my signature in presence of two witnesses.

EMILE BAPTISTE MÉRIGOUX.

Witnesses:
    JULIUS CAVERNE,
    HANSON C. COXE.